(12) United States Patent
Choi et al.

(10) Patent No.: US 9,705,148 B2
(45) Date of Patent: Jul. 11, 2017

(54) STACKED STRUCTURE FOR FUEL CELL

(71) Applicant: MICO CO., LTD., Anseong-si (KR)

(72) Inventors: Song Ho Choi, Anseong-si (KR); Sang Pil Park, Anseong-si (KR); Sung Wook Kim, Anseong-si (KR)

(73) Assignee: MICO CO., LTD., Anseong-si (KR)

( * ) Notice: Subject to any disclaimer, the term of this patent is extended or adjusted under 35 U.S.C. 154(b) by 0 days.

(21) Appl. No.: 14/405,860

(22) PCT Filed: May 28, 2013

(86) PCT No.: PCT/KR2013/004633
§ 371 (c)(1),
(2) Date: Dec. 5, 2014

(87) PCT Pub. No.: WO2013/183885
PCT Pub. Date: Dec. 12, 2013

(65) Prior Publication Data
US 2015/0180075 A1    Jun. 25, 2015

(30) Foreign Application Priority Data

Jun. 8, 2012 (KR) .................. 10-2012-0061316

(51) Int. Cl.
*H01M 2/20* (2006.01)
*H01M 8/242* (2016.01)
*H01M 8/0202* (2016.01)
*H01M 8/0273* (2016.01)
*H01M 8/2465* (2016.01)
(Continued)

(52) U.S. Cl.
CPC ......... *H01M 8/242* (2013.01); *H01M 8/0202* (2013.01); *H01M 8/0258* (2013.01); *H01M 8/0273* (2013.01); *H01M 8/2465* (2013.01); *H01M 8/2425* (2013.01); *H01M 2008/1293* (2013.01)

(58) Field of Classification Search
CPC ....... H01M 2008/1293; H01M 8/0202; H01M 8/0258; H01M 8/0273; H01M 8/242; H01M 8/2425; H01M 8/2465; Y02E 60/50
See application file for complete search history.

(56) References Cited

U.S. PATENT DOCUMENTS

2009/0291350 A1* 11/2009 Ishida ................ H01M 8/0247
429/499
2013/0130144 A1* 5/2013 Todo .................. H01M 8/0258
429/456

FOREIGN PATENT DOCUMENTS

JP    WO 2011/148769    *  1/2011    ............. H01M 8/02

\* cited by examiner

*Primary Examiner* — Patrick Ryan
*Assistant Examiner* — Ben Lewis
(74) *Attorney, Agent, or Firm* — Norton Rose Fulbright US LLP

(57) ABSTRACT

Provided is a stacked structure for a fuel cell in which the plurality of fuel cells are stacked. Each of the fuel cells includes an electrolyte layer, and a cathode layer and an anode layer disposed on both surfaces of the electrolyte layer. The stacked structure includes at least one interconnector, at least one frame, and at least one complex functional part. The interconnector includes a central area electrically connected to the fuel cell, and edge area outwardly extending with respect to end portions of the fuel cell. The frame supports a side portion of the fuel cell to reinforce strength of the fuel cell supported by the interconnector. The
(Continued)

complex functional part is disposed between the interconnector and the frame to constantly maintain an interval therebetween.

15 Claims, 6 Drawing Sheets

(51) Int. Cl.
    *H01M 8/0258*     (2016.01)
    *H01M 8/124*     (2016.01)
    *H01M 8/2425*     (2016.01)

STACKED STRUCTURE FOR FUEL CELL

CROSS-REFERENCE TO RELATED APPLICATION

This application is a national phase application under 35 U.S.C. §371 of International Patent Application No. PCT/KR2013/004633 filed May 28, 2013, which claims priority to and the benefit of Korean Patent Application No. 10-2012-0061316, filed on Jun. 8, 2012. The disclosures of the referenced applications are incorporated herein by reference.

BACKGROUND

1. Field of the Invention

The present invention relates to a stacked structure for a fuel cell, and more particularly, to a stacked structure in which a plurality of fuel cells are stacked to increase an electric power amount.

2. Discussion of Related Art

Generally, fuel cells are power generators which include a cathode layer and a anode layer formed on both sides of an electrolytic layer, respectively, and in which, when air including oxygen and a fuel gas including hydrogen are caused to flow to the air electrode layer and the fuel electrode layer, respectively, the hydrogen reacts with the oxygen through an ion conductive phenomenon in the electrolytic layer, and thereby electricity is generated.

The fuel cells have eco-friendly characteristics of a high efficient and pollution-free power generator which has simple energy conversion steps and generates energy by oxidizing hydrogen in principle, and thus research is being actively processed recently.

In particular, a solid oxide fuel cell (SOFC) among the fuel cells is a fuel cell which uses a ceramic as an electrolyte and operates at a high temperature in a range of about 600 to 1,000° C., and has various advantages in that it is a type having the highest efficiency and lowest pollution among a variety of types of fuel cells such as other molten carbonate fuel cell (MCFC), a phosphoric acid fuel cell (PAFC), a polymer electrolyte fuel cell (PEFC), or the like, and combined generation is possible without requiring a fuel reformer.

Since a cell composed of a pair of an electrolyte layer, a cathode layer, and a anode layer of the fuel cell usually refers to a single cell, and electricity generated by the single cell is a voltage less than about 1 V and does not have effectiveness, a technology of increasing a generated voltage by stacking the plurality of single cells in a stacked structure shape is being highlighted.

The stacked structure necessarily requires a plurality of interconnectors which electrically connect the single cells therebetween and have channels through which the air or the fuel gas flows at a position in contact with the cathode layer and the anode layer of the single cell. Also, the interconnector necessarily requires a space extending from an end portion of the single cell so as to supply the air or the fuel gas while sealing is performed such that the air or the fuel gas are mixed with each other.

However, when the single cells and the interconnectors are manufactured to have very thin thicknesses so as to decrease a volume of the stacked structure, strength thereof is weakened, and thus defects such as bending or sagging may be generated by heat or a load during operation.

Also, when the bending or the sagging occurs as mentioned above, adjacent interconnectors may short-circuit in the extending space, and thus electricity generated from the short-circuited single cells may not be collected in some cases.

SUMMARY OF THE INVENTION

The present invention is directed to a stacked structure for a fuel cell capable of preventing interconnectors from being short-circuited while reinforcing strength in constituting a stack of a solid oxide fuel cell.

According to an aspect of the present invention, there is provided a stacked structure for a fuel cell in which the plurality of fuel cells are stacked, the fuel cells each include an electrolyte layer, and a cathode layer and a anode layer disposed on both surfaces of the electrolyte layer to generate electricity, the stacked structure for the fuel cell includes at least one interconnector, at least one frame, and at least one complex functional part. The interconnector is divided into a central area electrically connected to each fuel cell while supporting each fuel cell, and edge areas extending from end portions of the fuel cell between the plurality of fuel cells. The frame is disposed to support a side portion of the fuel cell in one of the edge areas to reinforce strength of the fuel cell supported by the interconnector. The complex functional part is disposed on any one of the interconnector and the frame in a supply area or a discharge area in which air or a fuel gas is supplied or discharged to each of the cathode layer or the anode layer of the fuel cell among the edge area, and configured to constantly maintain an interval therebetween. Thus, the complex functional part may include a ceramic material.

According to one embodiment of the present invention, the plurality of complex functional parts may be disposed between the plurality of interconnectors and the plurality of frames, respectively. Thus, the plurality of complex functional parts may be disposed in a straight line in a direction in which the fuel cells are stacked.

A height of the complex functional part according to one embodiment of the present invention may be smaller than or the same as an interval between the interconnector and the frame in the edge area.

The interconnector according to one embodiment of the present invention may include channel forming portions used to form a plurality of channels through which the air or the fuel gas uniformly flows in the central area, and a height of the complex functional part may be greater than a depth of each channel.

A width of the complex functional part according to one embodiment of the present invention may be greater than or the same as a width of each channel forming portion.

The stacked structure according to one embodiment of the present invention may further include a plurality of supports formed in one of the frame and the interconnector to support a side portion of the complex functional part.

The interconnector according to one embodiment of the present invention may include a plurality of dots disposed to uniformly disperse the air or the fuel gas in the edge area. Thus, the complex functional part may be disposed on the interconnector and a side portion thereof is supported by the dots in the edge area.

The complex functional part according to another embodiment of the present invention may have a structure to be inserted into at least one among the dots through an insert part.

The complex functional part according to still another embodiment of the present invention may have a structure to be inserted into an insert recess formed in one of the interconnector and the frame in a supply area or a discharge area in which an air or a fuel gas is supplied or discharged.

According to another aspect of the present invention, there is provided a stacked structure for a fuel cell in which the plurality of fuel cells are stacked, the fuel cells each include an electrolyte layer, and a cathode layer and a anode layer disposed on both surfaces of the electrolyte layer to generate electricity, the stacked structure for the fuel cell includes a plurality of interconnectors and a plurality of complex functional parts. The plurality of interconnectors are divided into a central area electrically connected to each fuel cell while supporting each fuel cell, and edge areas extending from end portions of the fuel cell between the plurality of fuel cells. The plurality of complex functional parts are disposed on one of the facing interconnectors in a supply area or a discharge area in which air or a fuel gas is supplied or discharged to each of the cathode layer or the anode layer of the fuel cell among the edge areas, and configured to constantly maintain an interval therebetween. Thus, the complex functional parts may include a ceramic material.

The complex functional parts according to one embodiment of the present invention may be disposed in a straight line in a direction in which the fuel cells are stacked.

The stacked structure according to one embodiment of the present invention may further include a plurality of supports formed in each interconnector to support a side portion of the complex functional part.

According to the above-mentioned stacked structure for the fuel cell, overall strength of a stacked structure is increased by additionally supporting side portions of the fuel cells through frames disposed in edge areas of the interconnectors, and thus occurrence of defects such as bending or sagging caused by heat or a load of the stacked structure during operation may be prevented without increasing a thickness of the interconnector.

Also, a complex functional part which is disposed between each interconnector and each frame and constantly maintains an gap interval therebetween is disposed, and thus short-circuiting of the interconnector and the frame may be prevented. Thus, as a result, since the short-circuiting of adjacent interconnectors is prevented, a fuel cell which does not connect electricity therebetween as mentioned in Discussion of Related Art is not generated, and thus electricity generated from all of the fuel cells may be efficiently collected.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
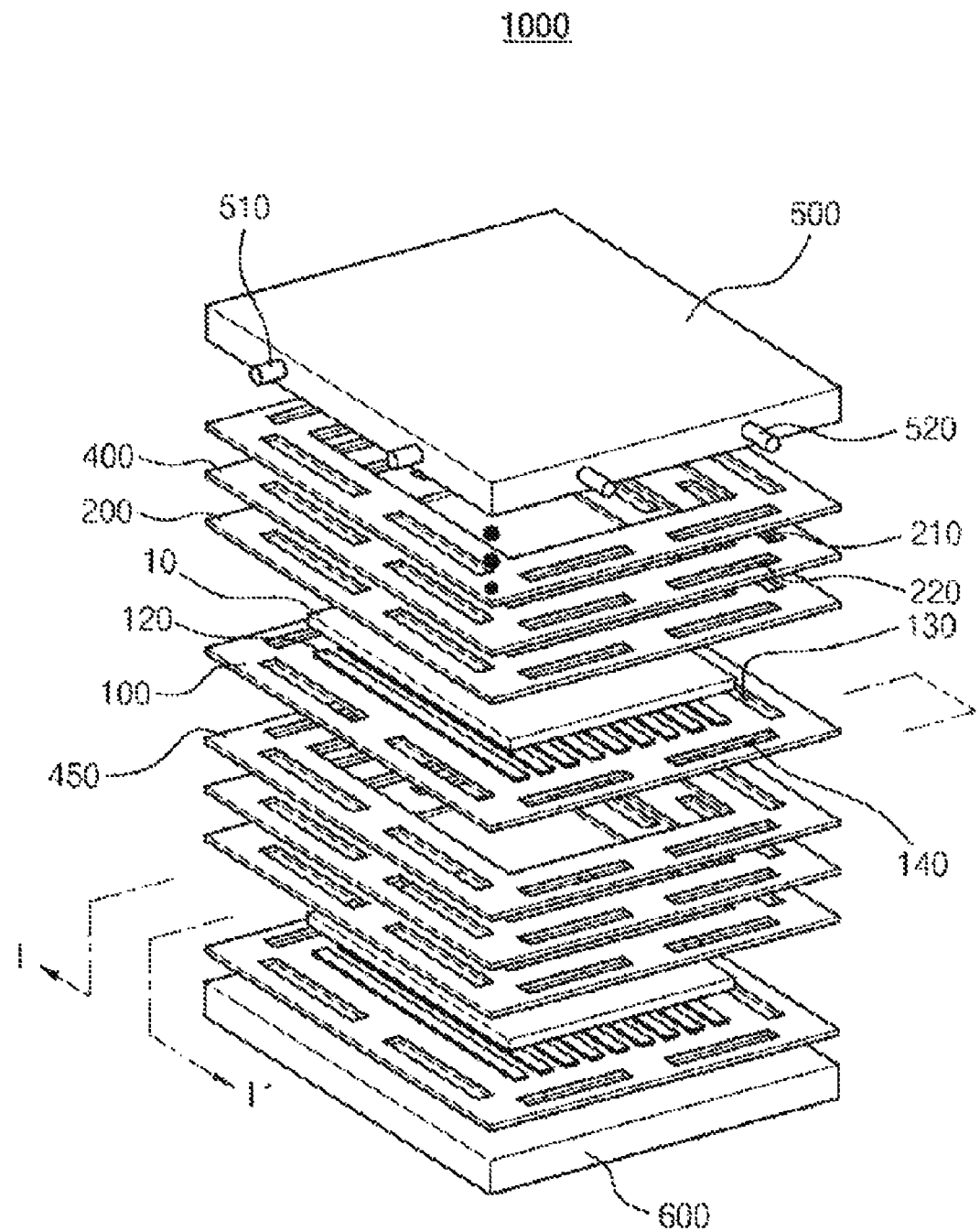
FIG. 1 is an exploded perspective view illustrating a stacked structure according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

In case it is mentioned that a certain component is "disposed" or "connected" on or to another component or layer, it may be understood that the certain component is directly disposed on or connected to the another component or that a component is interposed between the components. However, in case it is mentioned that a certain component is "directly" disposed or "connected" on or to another component, it should be understood that no component is interposed between the components. Though terms including ordinal numbers such as a "first", a "second", a "third", etc. may be used to explain various components, such as elements, composites, regions, layers and/or parts, the components are not limited to the terms.

Terms used in the present invention are to merely explain specific embodiments, thus it is not meant to be limiting. Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Examples of the present invention will be described with reference to cross-section drawings that are schematic drawings of ideal embodiments. Accordingly, the drawings allow changes in shape, for example, changes in manufacturing method and/or permissible error. In other words, the examples of the present invention are not limited to the specific shapes illustrated in the drawings but include some deviations in shape. Also, the regions shown in the drawings are merely schematic, and the shapes of the regions are intended neither to show the exact shapes of the regions nor to limit the scope of the invention.

Figure 2:
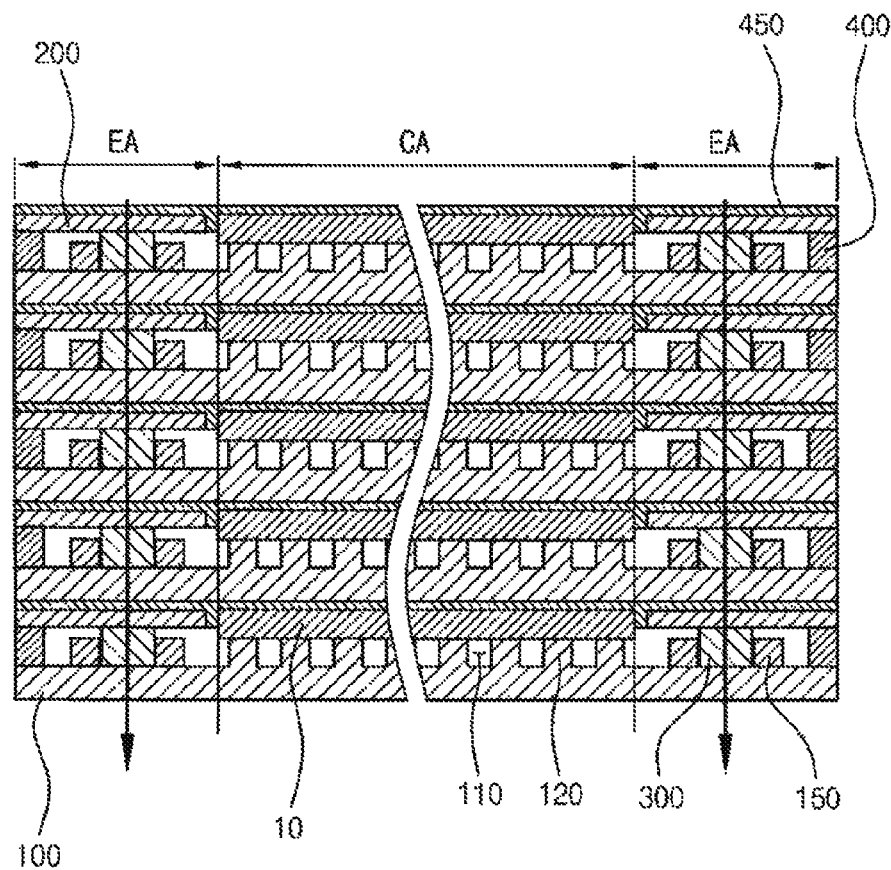
FIG. 2 is a cross-sectional view taken along line I-I' shown in FIG. 1.
Figure 3:
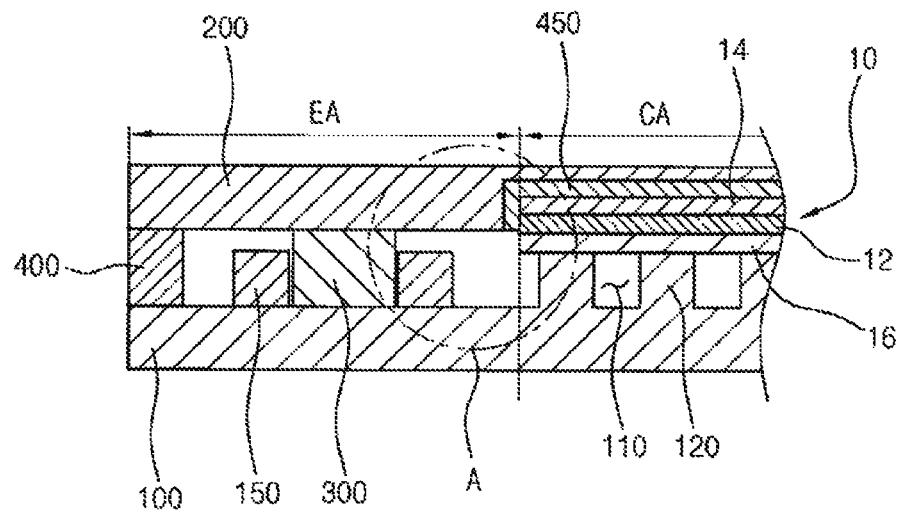
FIG. 3 is a view illustrating a portion of a stacked structure shown in FIG. 2.
Figure 4:
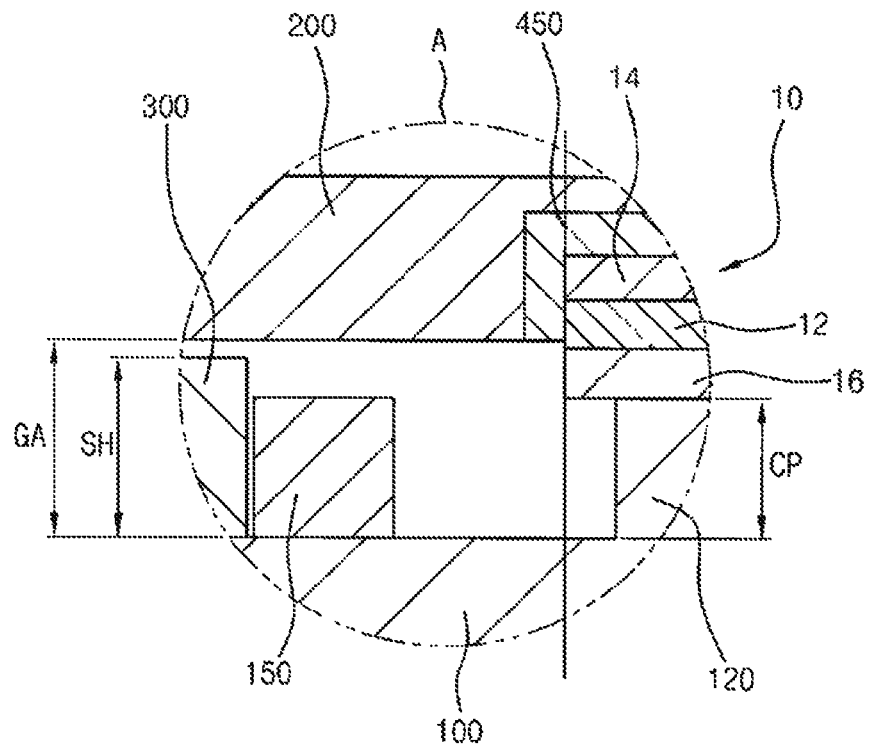
FIG. 4 is an enlarged view illustrating portion A shown in FIG. 3.

FIG. 1 is an exploded perspective view illustrating a stacked structure according to an embodiment of the present invention, FIG. 2 is a cross-sectional view taken along line I-I' shown in FIG. 1, FIG. 3 is a view illustrating a portion of a stacked structure shown in FIG. 2, and FIG. 4 is an enlarged view illustrating a portion 'A' shown in FIG. 3.

Referring to FIGS. 1 to 4, a stacked structure 1000 for a fuel cell according to an embodiment of the present invention includes a plurality of interconnectors 100, a plurality of frames 200, and a plurality of complex functional parts 300.

The interconnectors 100 are disposed between fuel cells 10 which have a flat plate structure. Here, the fuel cell 10 includes an electrolyte layer 12, and a cathode layer 14 and an anode layer 16 disposed on both surfaces of the electrolyte layer 12, respectively, and thus generates electricity. In particular, when air including oxygen and a fuel gas including hydrogen flow through the cathode layer 14 and the anode layer 16, respectively, the hydrogen electrochemically reacts with the oxygen in the electrolyte layer 12 by an ion conductive phenomenon, and thus the fuel cell 10 generates electricity.

The electrolyte layer 12 may be formed of a ceramic material such as yttria-stabilized zirconia (YSZ), (La, Sr) (Ga, Mg)$O_3$, Ba(Zr,Y)$O_3$, GDC (Gd doped Ce$O_2$), YDC ($Y_2O_3$ doped Ce$O_2$), or the like, which has high ion conductivity, excellent stability, and excellent mechanical characteristics at an oxidization-reduction atmosphere. The fuel cell 10 including the electrolyte layer 12 may be a solid oxide fuel cell (SOFC), and have characteristics of operating at a high temperature in a range of about 600 to 1,000° C. The cathode layer 14 may be formed in a porous structure using Lanthanum strontium manganite (LSM), Lanthanum strontium cobalt ferrite (LSCF), or the like. The LSM is a complex of lanthanum (La), strontium (Sr) and manganese (Mn), and the LSCF is a complex material of lanthanum (La), strontium (Sr), cobalt (Co), and iron (Fe). The anode layer 16 may be formed in a porous structure using a mixture of Yttria-Stabilized Zirconia (YSZ) and nickel (Ni), and thus hydrogen may be transported.

The interconnector 100 has a wider area than the fuel cell 10. For example, the interconnector 100 may include a central area CA which overlaps with the fuel cell 10 to supports the fuel cell 10 and an edge area EA which surrounds the central area CA and does not overlap with the fuel cell 10.

The interconnector 100 is composed of a conductive material, and is electrically connected to the cathode layer 14 or the anode layer 16 of the fuel cell 10 which contacts the central area CA, thereby supporting them. For example, the interconnector 100 may be formed of a SUS-Cr material to endure the fuel cell 10 which operates at a high temperature. In this case, in order to prevent a decrease in conductivity by formation of a Cr$O_2$ film, which is oxidized from a poisoning material Cr among the materials, on a surface of the interconnector 100, and thus a coating layer (not shown) may be additionally formed on the surface of the interconnector 100. The coating layer, for example, may include Lanthanum strontium manganite (LSM) or Lanthanum strontium cobalt ferrite (LSCF). Also, the coating layer may be composed of a complex material including at least one or more selected from manganese (Mn), cobalt (Co), copper (Cu), iron (Fe), nickel (Ni), zinc (Zn), tin (Sn), and titanium (Ti).

The fuel cells 10 stacked using the interconnectors 100 are connected in series, thereby generating an electricity of higher voltage. Here, an additional porous charge collecting plate (not shown) may be additionally disposed between the interconnectors 100 and the cathode layer 14 or the anode layer 16 of the fuel cell 10 so as to efficiently collect the electricity generated therefrom.

The interconnector 100 may include channel forming portions 120 which is formed on the central area CA facing the cathode layer 14 or the anode layer 16 of the fuel cells 10 and form a plurality of channels 110 capable of uniformly flowing the air or the fuel gas. Here, since each of an upper surface and a lower surface of the interconnector 100 are electrically connected to one of the cathode layer 14 or the anode layer 16 and the other of the cathode layer 14 or the anode layer 16, respectively, the channel forming portions 120 may be formed on both the upper surface and the lower surface of the interconnector 100.

The frame 200 is disposed between the edge areas EA of adjacent ones of the interconnectors 100. The frame 200 additionally supports a side portion of the fuel cell 10, and thus reinforces strength of the stacked structure 1000 so that the fuel cells 10 or the interconnectors 100 are not bent or sagged by heat or load during operation of the stacked structure 1000. Also, the frame 200 may be precisely manufactured at substantially the same thickness as the fuel cell 10 so as not to affect an overall thickness of the stacked structure. For this reason, the frame 200 may be composed of a metallic material which has excellent strength and workability.

Thus, since strength of the stacked structure 1000 is reinforced by the frame 200, the interconnectors 100 may be formed at a thickness less than about 3 mm which is the minimum thickness not to be autonomously bent or sagged. As a result, an overall volume of the stacked structure 1000 is decreased by the interconnectors 100 manufactured less than about 3 mm, and thus handling of the stacked structure 1000 may be easy. In particular, since the volume may be further decreased when the number of stacked fuel cells 10 is increased to increase electric power generated from the stacked structure 1000, a greater effect may be expected.

Meanwhile, a first sealing part 400 may be disposed between edge portions of the interconnector 100 and the frames 200 so that the air and the fuel gas which respectively flow the channels of an upper surface and a lower surface of the interconnector 100 are sealed not to be mixed with each other. The first sealing part 400 may be formed of a glass sealant which has good sealing characteristics, in this case, and inevitably has fluidity by characteristics of the glass, and thus a fiber may be added to the glass sealant in order to decrease the fluidity.

Also, in order to prevent the air and the fuel gas from being mixed, the second sealing part 450 may further be interposed between the frame 200 and the fuel cell 10. The second sealing part 450 may be formed at a relatively very thin thickness so that the frame 200 sufficiently supports the side portion of the fuel cell 10. The second sealing part 450 may be formed to surround a portion of the cathode layer 14 or the anode layer 16 of the fuel cell 10, thereby increasing a sealing capacity. The second sealing part 450 may be formed of substantially the same material as the first sealing part 400.

Also, in order to independently supply the air or the fuel gas to each of the upper surface and the lower surface of the interconnector 100, air holes 130 through which the air is supplied and discharged may be formed through first and second sides of the interconnector 100 which face each other, and fuel holes 140 through which the fuel gas is supplied and discharged may be formed through third and fourth sides which face each other and are perpendicular to the first and second sides. Second air holes 210 and second fuel holes 220 coupled with the air holes 130 and the fuel holes 140 may also be formed through the frame 200, and thus the air and the fuel gas may be supplied and discharged.

According to the above structure, since the air and the fuel gas flow in a substantially perpendicular direction, the channels 110 formed on the upper surface of the interconnector 100 is perpendicular to the channels 110 formed on the lower surface of the interconnector 100.

The complex functional part 300 may be disposed between the edge area EA of the interconnector 100 and the frame 200 and may contact the interconnector 100. The complex functional part 300 supports the interconnector 100 and the frame 200 so that an interval between the interconnector 100 and the frame 200 maintains constant. Here, the complex functional part 300 may be disposed on an area of the edge area EA which is disposed between the air hole 130 or the fuel hole 140 and the central area CA, and thus assist a function of uniformly flowing the air or the fuel gas through the channels 110.

Also, the complex functional part 300 prevents shorting between the interconnector 100 and the frame 200 in the edge area EA. Thus, the complex functional part 300 is composed of an insulating ceramic material, in particular, may be composed of yttria-stabilized zirconia (YSZ) which has a similar thermal expansion ratio to that of SUS-Cr of the interconnector 100 and is stable. Thus, the complex functional part 300 may be attached to the interconnector 100 using an adhesive for a ceramic. Also, since the complex functional part 300 does not include a poisoning material such as Cr which is included in the interconnector 100, and chemically stable, an additional coating layer like in the interconnector 100 may be unnecessary to be formed.

As described above, since the complex functional part 300 which constantly maintains the uniform interval between the interconnector 100 and the frame 200 is disposed therebetween, short-circuiting between the interconnector 100 and the frame 200 is prevented, as a result, short-circuiting between adjacent interconnectors 100 is prevented, and thus the fuel cell 10 which does not collect charges as described in the Related Art may not be generated. Thus, the electricity generated from all of the fuel cells 10 is collected, and thus a decrease in electricity generation efficiency may be prevented. In the embodiment of the present invention, the complex functional part 300 is described to contact the interconnector 100, but the above effect will be expected even when it contact the frame 200.

In order to efficiently prevent short-circuiting between the interconnector 100 and the frame 200, a height SH of the complex functional part 300 may be smaller than the interval GA between the interconnector 100 and the frame 200. In particular, the complex functional part 300 supports the interconnector 100 or the frame 200 only when heat or a load is applied from the outside to decrease the interval GA, and prevents them from being short-circuited. When the height SH of the complex functional part 300 is formed greater than the above interval GA, the complex functional part 300 may push the frame 200 or the interconnector 100, and thus a sealing therebetween may be broken. Also, although the height SH of the complex functional part 300 is the same as the above interval GA, the frame 200 or the interconnector 100 is not substantially pushed, and thus the height SH of the complex functional part 300 may be the same as the interval GA between the interconnector 100 and the frame 200.

In order to efficiently support the interconnector 100 and the frame 200, the height SH of the complex functional part 300 may be formed greater than a depth CP of the channel 110 of the interconnector 100, that is, a height of the channel forming portion 120. When the heat or the load is applied to the stacked structure 1000 from the outside while the channel forming portions 120 in the central area CA contact the cathode layer 14 or the anode layer 16 of the fuel cell 10, the complex functional part 300 prevents the interconnector 100 and the frame 200 from being excessively bent in the edge area EA, thereby preventing damage caused by the above bending.

Also, in order to efficiently support both of the interconnectors 100 and the frames 200 which are alternately stacked, a plurality of the complex functional parts 300 may be disposed in a line in a vertical direction in which the fuel cells 10 are stacked. The load of the complex functional parts 300, which are disposed between the interconnectors 100 and the frames 200 and supports them, is repeated on the same position when viewed on a plane, and thus distortion which may occur when the complex functional parts 300 are alternately arranged is prevented, thereby securely supporting.

Thus, since the interconnectors 100 and the frame 200 which are made of a metal are securely supported by the complex functional part 300 while the stacked structure 1000 in which the plurality of fuel cells 10 are stacked operates, the complex functional part 300 prevents deformation thereof and increases overall strength of the stacked structure 1000.

Hereinafter, the complex functional part 300 will be explained in greater detail with additionally reference to FIGS. 5, 6, 7, and 8.

Figure 5:
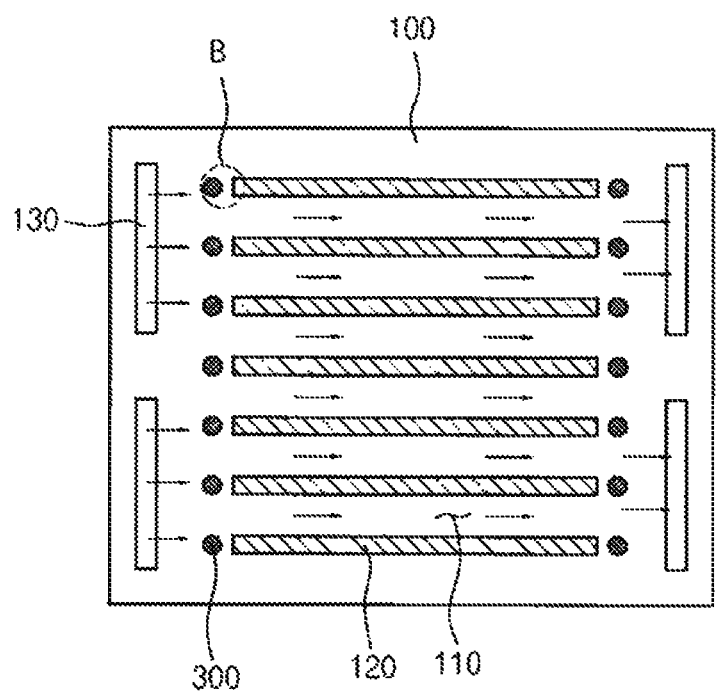
FIG. 5 is a view illustrating a complex functional part disposed on an interconnector of the stacked structure shown in FIG. 2 when viewed from the top.
Figure 6:
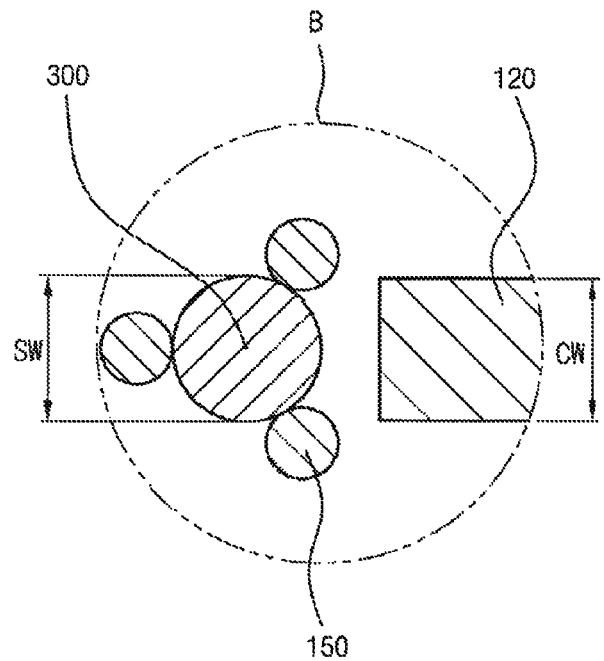
FIG. 6 is an enlarged view illustrating portion B shown in FIG. 5.

FIG. 5 is a view illustrating a complex functional part disposed on an interconnector of the stacked structure shown in FIG. 2 when viewed from the top, and FIG. 6 is an enlarged view illustrating portion B shown in FIG. 5.

Additionally referring to FIGS. 5 and 6, a complex functional part 300 may be formed on the same layer as the channel forming portions 120 acting as a partition wall of channels 110 without interference while air or a fuel gas flows through the channels 110 of an interconnector 100. Here, the complex functional part 300 may be disposed closer to the channel forming portion 120 as possible, and thus influence of the air or the fuel gas flow caused by the complex functional part 300 may be minimized. In an alternative embodiment, the complex functional part 300 may be alternately formed with respect to the channel forming portions 120 so that the air or the fuel gas is uniformly distributed into the channels 110.

The complex functional part 300 may have a width SW greater than or equal to a width CW of the channel forming portion 120. As the width CW of the channel forming portion 120 becomes thin, it is substantially hard to form the complex functional part 300 thinner than that.

In an alternative embodiment, a location and a size of the complex functional part 300 are changed in the edge area EA, and thus adjust the flow of the air or the fuel gas. That is, in order to uniformly supply the air or the fuel gas on the cathode layer 14 or the anode layer 16, the location and a size of the complex functional part 300 may be changed, and thus efficiency of electricity generation of the fuel cell 10 may be improved.

In order to securely support the interconnector 100 and the frame 200 when viewed on a plane, a plurality of the complex functional parts 300 may be formed in a uniform distribution in the edge area EA. Also, in order to more securely support them, a plurality of the complex functional parts 300 may be uniformly distributed in a symmetrical structure in the edge areas EA on both sides with respect to the central area CA.

In order to naturally guide the air or the fuel gas toward the channel 110, a cross-section of the complex functional part 300 may have a circular shape. Also, in order to securely fix a location of the complex functional part 300, the interconnector 100 may include a plurality of supports 150 configured to support a side portion of the complex functional part 300, and the supports 150 may be formed on the edge area EA of the interconnector 100. In the embodiment of the present invention, while the supports 150 is illustrated to be a component of the interconnector 100, the supports 150 may be a component of the frame 200 and may be formed on a surface of the frame 200 as long as the location of the complex functional part 300 is functionally fixed.

Also, in order to support the complex functional part 300 of the circular shape and not interfere the flow of the air or the fuel gas, the supports 150 may be disposed in a triangular arrangement having leftwardly and rightwardly spreading fronts to which the air or the fuel gas is supplied as apexes.

Figure 7:
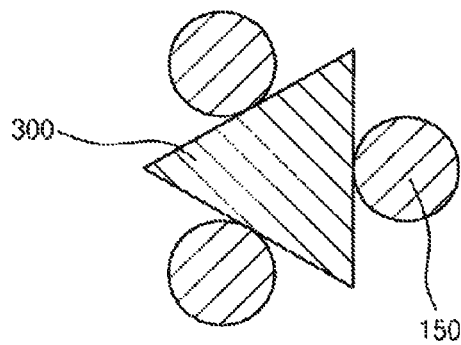
FIGS. 7 and 8 are views illustrating other cross-sectional shapes of complex functional parts disposed on an interconnector shown in FIG. 6.
Figure 8:
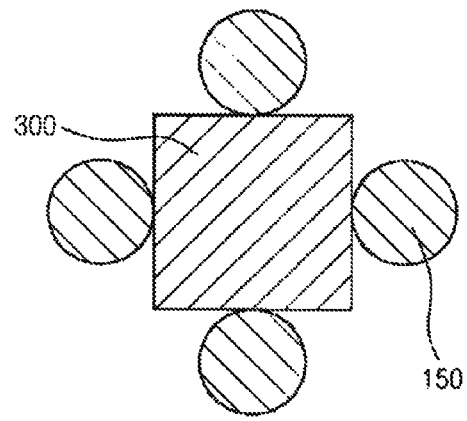

In alternative embodiments, a cross-section of the complex functional part 300 disposed on the interconnector 100 shown in FIG. 6 may be arranged in a polygonal shape such as a triangle or a quadrangle through FIGS. 7 and 8 which illustrate different cross-sectional shapes of the complex functional parts 300. In this case, in order to fix the location of the complex functional part 300, the supports 150 may be disposed to contact all of sides of the complex functional part 300, thereby supporting the complex functional part 300.

Hereinafter, the complex functional parts 300 according to other embodiments of the present invention will be explained in greater detail with reference to FIGS. 9 to 11.

Figure 9:
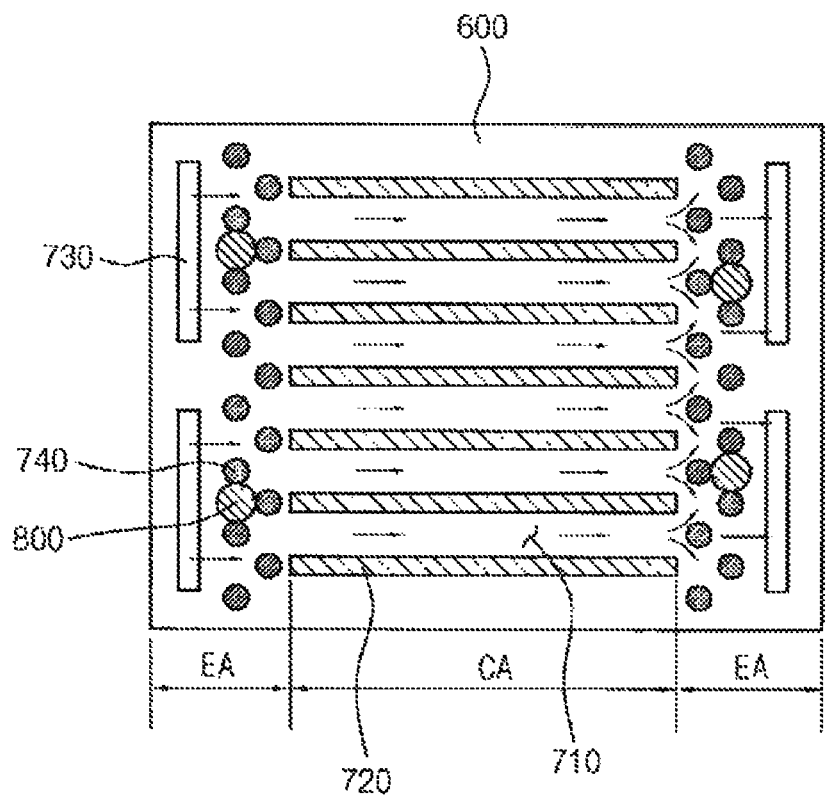
FIG. 9 is a view illustrating a complex functional part shown in FIG. 5 according to another embodiment of the present invention.

FIG. 9 is a view illustrating a complex functional part shown in FIG. 5 according to another embodiment of the present invention.

In the embodiment of the present invention, since the structure of the stacked structure 1000 is the same as that shown in FIGS. 3 to 5 except the complex functional part disposed in an interconnector, the same reference numeral is used for the same structure, and thus the repetitive detailed explanation thereof will be omitted.

Also, the embodiment of the present invention is the same except a flow structure of an air or a fuel gas which flows on a cathode layer and a anode layer is perpendicular to a flowing direction thereof, and thus for convenience of explanation, a structure according to the flow of the air will be explained as representation.

Referring to FIG. 9, in order to improve electricity generation efficiency of a fuel cell 10 (shown in FIG. 3) by uniformly dispersing air supplied through air holes 730 into channels 710 formed in a central area CA, a plurality of dots 740 may be formed in an edge area EA of the interconnector 700 according to the embodiment of the present invention.

The dots 740 may be alternately formed in a zigzag arrangement so as to uniformly disperse the air, and formed in at least two columns. Also, the dots 740 may be formed of the same material as the interconnector 700, and formed with the interconnector 700 during formation thereof.

In alternative embodiments, in order to improve the electricity generation efficiency of the fuel cell 10 (shown in FIG. 3) by increasing a time of maintaining the air in the channels 710, some of the dots 740 adjacent to an entrance of the channel may be formed in the edge area EA in the same line as the channel forming portions 720, and the other of the dots 740 adjacent to an exit of the channel may be formed to alternate between the channel forming portions 720 in the edge area EA through which the air is discharged.

The complex functional part 800 is disposed between the dots 740 of the zigzag shape so that a side portion thereof is supported by the dots 740 in the edge area EA of the interconnector 700, thereby preventing short-circuiting between the interconnector 700 and a frame 200 (shown in FIG. 3). Here, when the dots 740 are formed of a conductive material like the interconnector 700, a height of the complex functional part 800 may be formed greater than a height of the dots 740 so as to prevent short-circuiting between the interconnector 700 and the frame 200 (shown in FIG. 3) by the dots 740. Hereinafter, other characteristics of the complex functional part 800 are the same as the structure shown in FIGS. 3 to 5, and thus the detailed repetitive explanation thereof will be omitted.

In alternative embodiments, the dots 740 may be formed of the same material as the complex functional part 800 and a height thereof may be formed to be the same as the complex functional part 800, and thus the dots 740 may prevent the short-circuiting between the interconnector 700 and the frame 200 (shown in FIG. 3) with the complex functional part 800. Here, heights of the dots 740 may be entirely increased, but the short-circuit preventing function may be performed by increasing only some thereof so as to have a uniform distribution.

Figure 10:
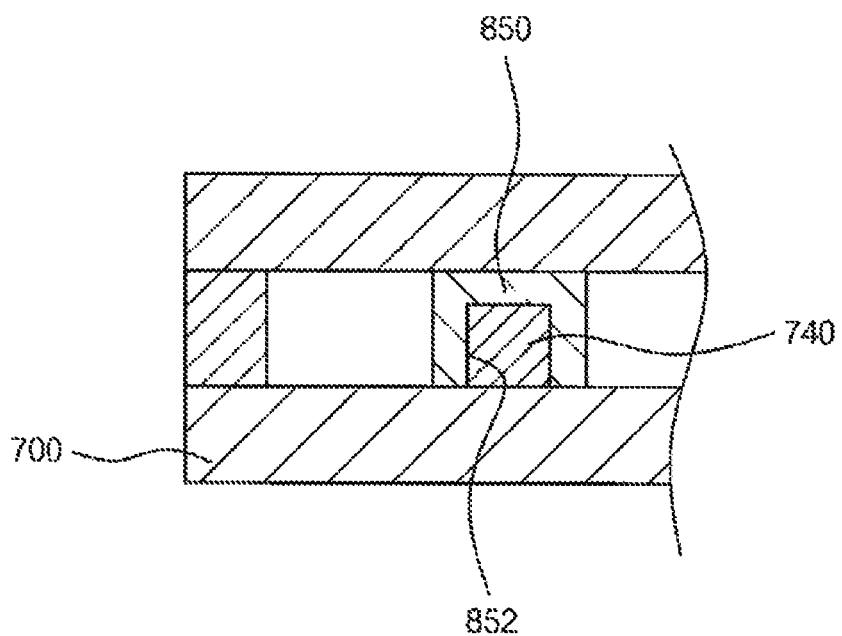
FIG. 10 is a view illustrating a complex functional part shown in FIG. 9 according to still another embodiment of the present invention.

FIG. 10 is a view illustrating a complex functional part shown in FIG. 9 according to still another embodiment of the present invention.

In the embodiment of the present invention, since the structure is the same as that shown in FIG. 9 except the complex functional part disposed in an interconnector, the same reference numeral is used for the same structure, and thus the repetitive detailed explanation thereof will be omitted.

Referring to FIG. 10, a complex functional part 850 includes an insert part 852 having a hole shape in a center into which the dot 740 is inserted.

Then, the complex functional part 850 is supported by the dot 740 in the insert part 852, and thus a location thereof may be securely fixed on the interconnector 700. Here, the complex functional part 850 may be combined to the dot 740 of the interconnector 700 by an adhesive paste filling the insert part 852 or hook-combining with the dot 740, so that the complex functional part 850 is not separated from the interconnector 700 during an overall fabrication process of a stacked structure 1000 (shown in FIG. 1).

In alternative embodiments, the insert part 852 may be formed to expose at least one side surface of the dot 740, thereby being combined with the dot 740 through a sliding method. In this case, insides of the dot 740 and the insert part 852 may have wedge shapes being narrower in a direction toward the interconnector 700 not to be separated from each other.

Figure 11:
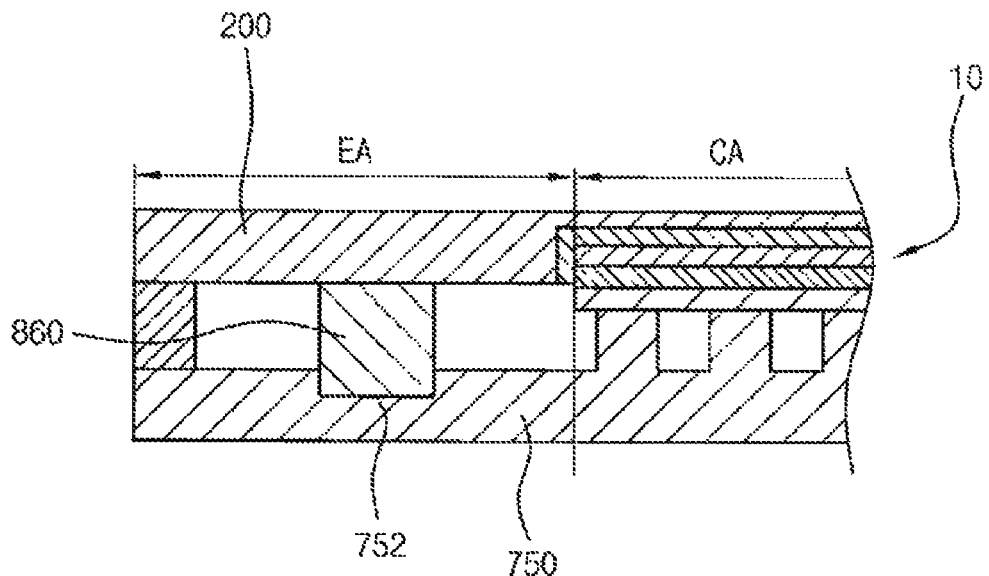
FIG. 11 is a view illustrating a complex functional part shown in FIG. 5 according to still another embodiment of the present invention.

FIG. 11 is a view illustrating a complex functional part shown in FIG. 5 according to still another embodiment of the present invention.

In the embodiment of the present invention, since the structure is the same as the structure illustrated in FIGS. 3 to 5 except a complex functional part is disposed on an interconnector, and thus the same reference numeral is used for the same structure, and the repetitive detailed explanation thereof will be omitted.

Referring to FIG. 11, a complex functional part 860 according to the still another embodiment of the present invention may be inserted into an insert recess 752 in an edge area EA of the interconnector 750.

Then, since the complex functional part 860 is supported by an inner side surface of the insert recess 752, a location thereof may be fixed. Here, since a depth of the insert recess 752 may not be formed to be deep enough because of a small thickness of the interconnector 750, an adhesive paste may be deposited in the insert recess 752 so as to securely fix a location of the complex functional part 860. That is, the insert recess 752 according to the embodiment of the present invention may substantially guide a location at which the complex functional part 860 is disposed, and the adhesive paste may perform a function of fixing the location thereof. In alternative embodiments, when the location at which the complex functional part 860 is disposed may be only unspecifically selected in the edge area EA, the insert recess 752 may be removed, and the complex functional part 860 may be directly disposed on one surface of the interconnector 750 by only the adhesive paste. On the other hand, an inlet of the insert recess 752 may have an inclined or rounded structure toward a periphery so as to guide the insertion of the complex functional part 860.

In the embodiment of the present invention, a structure in which the complex functional part 860 is inserted into the insert recess 752 of the interconnector 750 has been described, but the insert recess may be formed in the frame 200 instead of the interconnector 750, and thus the complex functional part 860 may be disposed.

Referring to FIGS. 1 to 4 again, stacked structures 1000 may further include an upper case 500 and a lower case 600 which are respectively stacked as an uppermost part and a lowermost part to protect the fuel cells 10, the interconnectors 100, and the frames 200 from the outside and provide overall strength.

First and second connection tubes 510 and 520, which are connected to an air supply device (not shown) and a fuel gas supply device (not shown) provided from the outside to respectively supply the air and the fuel gas to the cathode layer 14 and the anode layer 16 of the fuel cell 10, may be formed in the upper case 500. The first and second connection tubes 510 and 520 may be formed on different side portions perpendicular to each other to independently supply the air or the fuel gas to each of the cathode layer 14 and the anode layer 16 of the fuel cell 10. In the embodiment of the present invention, the first and second connection tubes 510 and 520 are formed in the upper case 500, but may be formed in the same position of the lower case 600, thereby sufficiently performing the function.

Figure 12:
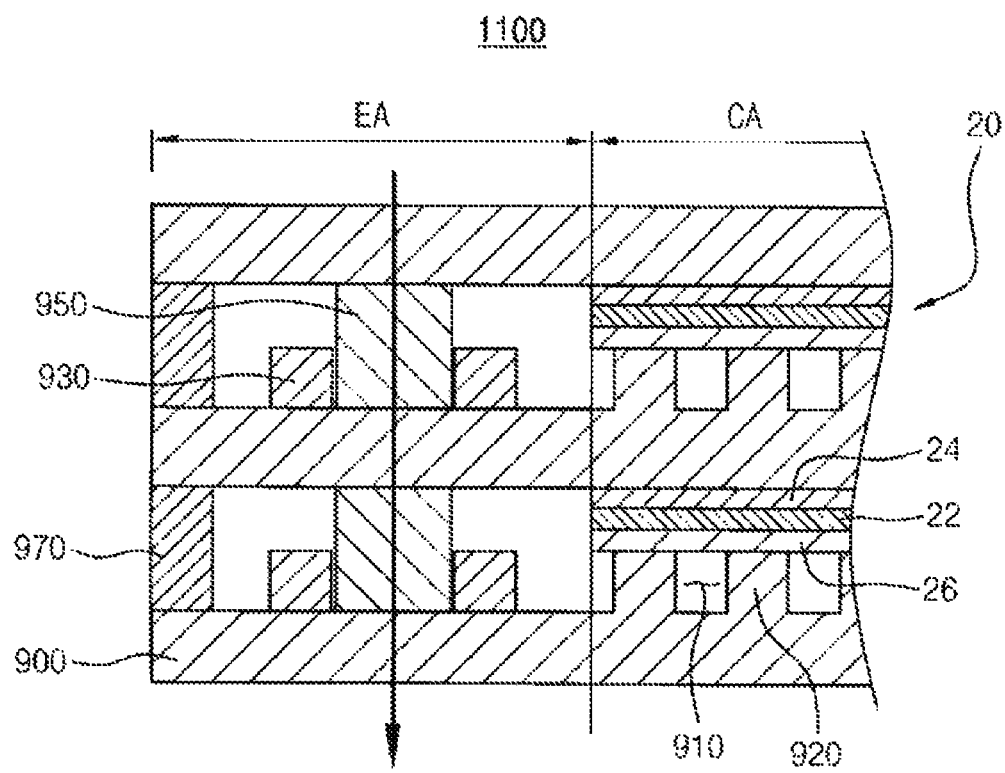
FIG. 12 is a view illustrating a cross-section of a stacked structure according to another embodiment of the present invention.

FIG. 12 is a view illustrating a cross-section of a stacked structure according to another embodiment of the present invention.

In the embodiment of the present invention, the stacked structure is the stacked structure illustrated in FIGS. 1 to 4 without a frame, and the repetitive detailed explanation thereof will be omitted.

Referring to FIG. 12, a stacked structure 1100 according to the another embodiment of the present invention includes a plurality of interconnectors 900 including a central area CA contacting a cathode layer 24 or a anode layer 26 of each thereof between stacked fuel cells 20, and an edge area EA surrounding the central area CA and extending outwardly with respect to an end portion of the fuel cell 20, and a plurality of complex functional parts 950 disposed between the interconnectors 900 in the edge area EA so as to uniformly maintain an interval between the interconnectors 900.

In the interconnector 900, the channel forming portions 920 configured to form a plurality of channels 910 through which an air or a fuel gas uniformly flows to the central area CA opposite to the cathode layer 24 or the anode layer 26 of the fuel cell 20. Thus, since the cathode layer 24 or the anode layer 26 is electrically connected to each of an upper surface and a lower surface of the interconnector 900, the channel forming portions 920 may be substantially formed on the upper surface and the lower surface of the interconnector 900. Here, in order to prevent the air or the fuel gas from mixing, a sealing part 970 configured to independently seal spaces thereof may be formed in an edge portion of the interconnectors 900.

The complex functional parts 950 are made of an insulating ceramic material, and thus, short-circuiting between the interconnectors 900 is prevented. In order not to interfere functions of each structural part of the stacked structure 1100 and prevent short-circuiting, a height of the complex functional parts 950 may be smaller than an interval between the interconnectors 900, and greater than a depth of the channel 910.

In order to securely support the interconnectors 900, the complex functional parts 950 may be arranged in a straight line in a vertical direction which is a stacked direction of the stacked structure 1100. Also, in order to securely fix a location of the complex functional part 950, a plurality of supports 930 configured to support a side portion of the complex functional part 950 may be formed in the interconnector 900. Hereinafter, detailed explanations concerning the complex functional part 950 are the same as that explained with reference to FIGS. 2 to 11, and thus, the repetitive detailed explanation thereof will be omitted.

Thus, since the complex functional part 950 which constantly maintains an interval between interconnectors 900 is disposed between the interconnectors 900 and prevents short-circuiting therebetween, a fuel cell 20 which cannot collect electricity by the short-circuiting may not be generated, and thus electricity generation efficiency may be improved.

The stacked structures 1000 and 1100 of the present invention explained above are explained to be applied to the SOFC using a ceramic as an electrolyte, but they can also be understood to be applied to another fuel cell such as a MCFC, a PAFC, or a PEFC which has a stacked structure to increase electric power.

The present invention has been particularly shown and described with reference to the embodiments illustrated in the appended drawings. The embodiments are, however, provided as examples only used for a better understanding of the present invention. It would be obvious to those of ordinary skill in the art that the above embodiments are to cover all modifications, equivalents, and alternatives falling within the scope of the invention. Accordingly, it will be understood that various changes in form and details may be made therein without departing from the spirit and scope of the following claims.

According to the above explanations, in a stacked structure in which a plurality of fuel cells are stacked, a frame configured to support a side portion of the fuel cell like an interconnector configured to support the fuel cell in a central area is added, thereby being used in the stacked structure for the fuel cell which is capable of reinforcing strength.

Also, since a complex functional part disposed between the interconnector and the frame and configured to constantly maintain an interval therebetween, short-circuiting therebetween may be prevented, eventually, short-circuiting between a plurality of the interconnectors may be prevented, thereby being used in the stacked structure for the fuel cell which prevents generation of a fuel cell from which does not collect electricity.

What is claimed is:

1. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:

at least one interconnector disposed between adjacent fuel cells of the plurality of fuel cells, the interconnector including a central area electrically connected to the adjacent fuel cells while supporting one of the adjacent fuel cells and an edge area extending outwardly with respect to end portions of the adjacent fuel cells;

at least one frame disposed on the edge area of the interconnector, the frame supporting a side portion of the one of the adjacent fuel cells to reinforce strength of the one fuel cell supported by the interconnector; and at least one complex functional part disposed between the edge area of the interconnector and the frame to constantly maintain an interval therebetween, the complex functional part contacting any one of the interconnector and the frame, wherein the interconnector comprises channel forming portions forming a plurality of channels through which the air or the fuel gas flows in the central area, and wherein a width of the complex functional part is greater than or the same as a width of each channel forming portion, or a height of the complex functional part is greater than a depth of each channel.

2. The stacked structure for the fuel cell of claim 1, wherein the complex functional part comprises a ceramic material.

3. The stacked structure for the fuel cell of claim 1, wherein a plurality of complex functional parts are disposed between a plurality of interconnectors and a plurality of frames, respectively, and the plurality of complex functional parts are disposed in a straight line in a direction in which the fuel cells are stacked.

4. The stacked structure for the fuel cell of claim 1, wherein a height of the complex functional part is smaller than or the same as an interval between the interconnector and the frame in the edge area.

5. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:

at least one interconnector disposed between adjacent fuel cells of the plurality of fuel cells, the interconnector including a central area electrically connected to the adjacent fuel cells while supporting one of the adjacent fuel cells and an edge area extending outwardly with respect to end portions of the adjacent fuel cells;

at least one frame disposed on the edge area of the interconnector, the frame supporting a side portion of the one of the adjacent fuel cells to reinforce strength of the one fuel cell supported by the interconnector; and at least one complex functional part disposed between the edge area of the interconnector and the frame to constantly maintain an interval therebetween, the complex functional part contacting any one of the interconnector and the frame, wherein one of the frame and the interconnector comprises a plurality of supports supporting a side portion of the complex functional part.

6. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:

at least one interconnector disposed between adjacent fuel cells of the plurality of fuel cells, the interconnector including a central area electrically connected to the adjacent fuel cells while supporting one of the adjacent fuel cells and an edge area extending outwardly with respect to end portions of the adjacent fuel cells, the interconnector comprising channel forming portions forming a plurality of channels through which air or a fuel gas flows in order to supply the air or the fuel gas to the cathode layer or the anode layer in the central area and a plurality of dots formed in a supply area or a discharge area in which the air or the fuel gas is supplied or discharged among the edge areas, the dots being disposed to uniformly disperse the air or the fuel gas to the channels;

at least one frame disposed on the edge area of the interconnector, the frame supporting a side portion of the one of the adjacent fuel cells to reinforce strength of the one fuel cell supported by the interconnector; and a complex functional part having an insert part into which one of the dots is inserted, the complex functional part being disposed between the interconnector and the frame to maintain an interval between the interconnector and the frame.

7. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:

at least one interconnector disposed between adjacent fuel cells of the plurality of fuel cells, the interconnector including a central area electrically connected to the adjacent fuel cells while supporting one of the adjacent fuel cells and an edge area extending outwardly with respect to end portions of the adjacent fuel cells;

at least one frame disposed on the edge area of the interconnector, the frame supporting a side portion of the one of the adjacent fuel cells to reinforce strength of the one fuel cell supported by the interconnector; and a complex functional part inserted into an insert recess formed in one of the interconnector and the frame in the edge area, the complex functional part constantly maintaining an interval between the interconnector and the frame.

8. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:

a plurality of interconnectors disposed between adjacent fuel cells of the plurality of fuel cells, respectively, each of the interconnectors including a central area electrically connected to the adjacent fuel cells while supporting one of the adjacent fuel cells and an edge area extending outwardly with respect to end portions of the adjacent fuel cells, each interconnector comprising channel forming portions forming channels through which the air or the fuel gas flows in the central area; and a plurality of complex functional parts disposed between adjacent interconnectors of the plurality of interconnectors, respectively, each of the complex functional parts being disposed in a supply area or a discharge area in which air or a fuel gas is supplied to or discharged from channels among the edge areas, and constantly maintaining an interval the adjacent interconnectors, wherein a height of each complex functional part is greater than a depth of each channel, or a width of each complex functional part is greater than or the same as a width of each channel forming portion.

9. The stacked structure for the fuel cell of claim 8, wherein the complex functional parts comprise a ceramic material.

10. The stacked structure for the fuel cell of claim 8, wherein the complex functional parts are disposed in a straight line in a direction in which the fuel cells are stacked.

11. The stacked structure for the fuel cell of claim 8, wherein a height of each complex functional part is smaller than or the same as an interval between the interconnectors in the edge area.

12. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:
 a plurality of interconnectors disposed between adjacent fuel cells of the plurality of fuel cells, respectively, each of the interconnectors including a central area electrically connected to the adjacent fuel cells while supporting one of the adjacent fuel cells and an edge area extending outwardly with respect to end portions of the adjacent fuel cells; and
 a plurality of complex functional parts disposed between adjacent interconnectors of the plurality of interconnectors, respectively, each of the complex functional parts being disposed in a supply area or a discharge area in which air or a fuel gas is supplied to or discharged from channels among the edge areas, and constantly maintaining an interval the adjacent interconnectors,
 wherein each of the interconnectors comprises a plurality of supports supporting a side portion of each complex functional part.

13. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:
 a plurality of interconnectors disposed between adjacent fuel cells of the plurality of fuel cells, respectively, each of the interconnectors including a central area electrically connected to the adjacent fuel cells while supporting one of the adjacent fuel cells and an edge area extending outwardly with respect to end portions of the adjacent fuel cells; and
 a plurality of complex functional parts disposed between adjacent interconnectors of the plurality of interconnectors, respectively, each of the complex functional parts being disposed in a supply area or a discharge area in which air or a fuel gas is supplied to or discharged from channels among the edge areas, and constantly maintaining an interval the adjacent interconnectors,
 wherein each interconnector comprises:
 channel forming portions forming a plurality of channels through which the air or the fuel gas flows in the central area; and
 a plurality of dots disposed in the edge area, the dots configured to uniformly disperse the air or the fuel gas to the channels in a supply area or a discharge area in which the air or the fuel gas is supplied or discharged, and
 wherein each complex functional part is disposed between the dots so that a side portion thereof is supported by the dots.

14. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:
 a plurality of interconnectors disposed between adjacent fuel cells of the plurality of fuel cells, respectively, each of the interconnectors including a central area electrically connected to the adjacent fuel cells while supporting one of the adjacent fuel cells and an edge area extending outwardly with respect to end portions of the adjacent fuel cells; and
 a plurality of complex functional parts disposed between adjacent interconnectors of the plurality of interconnectors, respectively, each of the complex functional parts being disposed in a supply area or a discharge area in which air or a fuel gas is supplied to or discharged from channels among the edge areas, and constantly maintaining an interval the adjacent interconnectors,
 wherein each interconnector comprises:
 channel forming portions forming a plurality of channels through which the air or the fuel gas flows in the central area; and
 a plurality of dots disposed in the edge area, the dots configured to uniformly disperse the air or the fuel gas to the channels in a supply area or a discharge area in which the air or the fuel gas is supplied or discharged, and
 wherein each complex functional part comprises an insert part into which at least one of the dots is inserted.

15. A stacked structure for a fuel cell in which a plurality of fuel cells are stacked, and the fuel cells each include an electrolyte layer, and a cathode layer and a anode layer disposed on both surfaces of the electrolyte layer to generate electricity, the stacked structure for the fuel cell comprising:
 a plurality of interconnectors disposed between adjacent fuel cells of the plurality of fuel cells, respectively, each of the interconnectors including a central area electrically connected to the adjacent fuel cells while supporting one of the adjacent fuel cells and an edge area extending outwardly with respect to end portions of the adjacent fuel cells; and
 a plurality of complex functional parts disposed between adjacent interconnectors of the plurality of interconnectors, respectively, each of the complex functional parts being disposed in a supply area or a discharge area in which air or a fuel gas is supplied to or discharged from channels among the edge areas, and constantly maintaining an interval the adjacent interconnectors,
 wherein each complex functional part is inserted into an insert recess formed in one of the adjacent interconnectors.

* * * * *